MAGNETIC RECORDING

Filed Sept. 1, 1953 7 Sheets-Sheet 1

INVENTOR
Bruce Roberts
BY
Synnestvedt & Lechner
ATTORNEYS

Nov. 12, 1957 B. ROBERTS 2,812,948

MAGNETIC RECORDING

Filed Sept. 1, 1953 7 Sheets-Sheet 2

INVENTOR
Bruce Roberts
BY
Synnestvedt & Lechner
ATTORNEYS

Nov. 12, 1957 B. ROBERTS 2,812,948

MAGNETIC RECORDING

Filed Sept. 1, 1953 7 Sheets-Sheet 3

INVENTOR
Bruce Roberts
BY
Synnestvedt & Lechner
ATTORNEYS

Nov. 12, 1957 B. ROBERTS 2,812,948
MAGNETIC RECORDING
Filed Sept. 1, 1953 7 Sheets-Sheet 4
Fig. 6. Fig. 7.
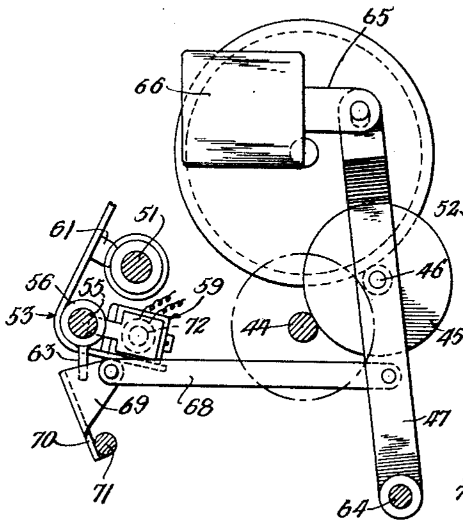
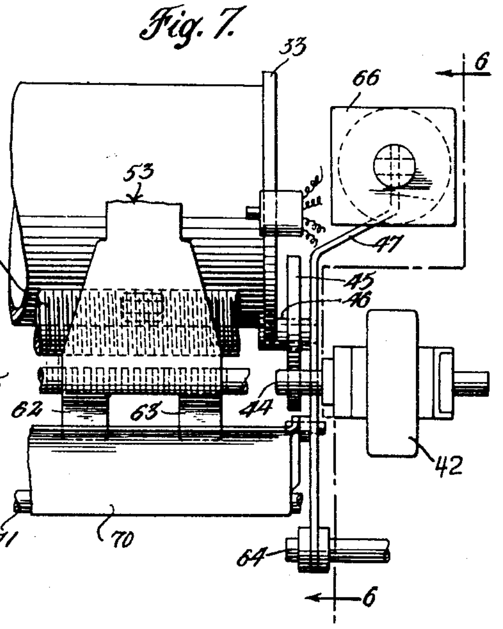
Fig. 11.
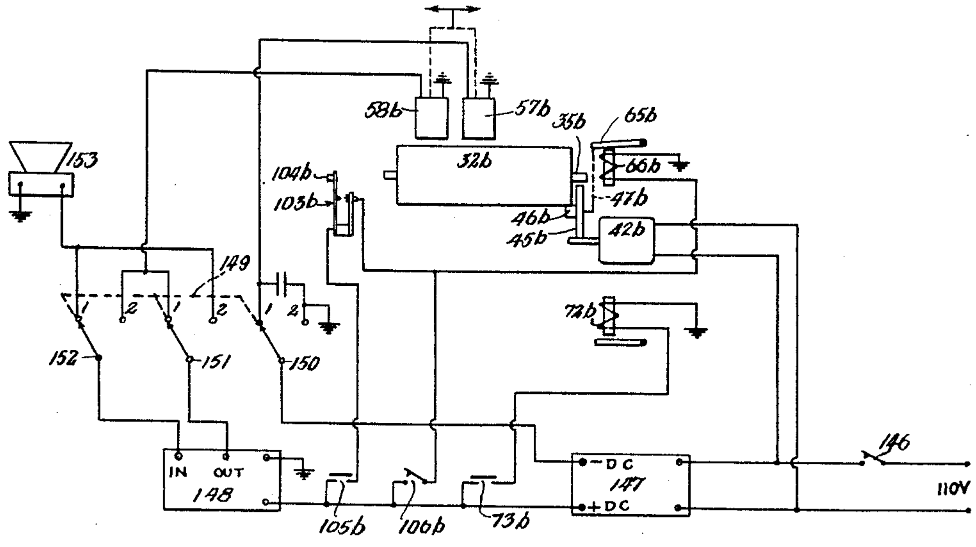
INVENTOR
Bruce Roberts
BY
Synnestvedt & Lechner
ATTORNEYS Nov. 12, 1957 B. ROBERTS 2,812,948

MAGNETIC RECORDING

Filed Sept. 1, 1953 7 Sheets-Sheet 5

INVENTOR

Bruce Roberts

BY

Synnestvedt & Lechner

ATTORNEYS

Nov. 12, 1957 B. ROBERTS 2,812,948

MAGNETIC RECORDING

Filed Sept. 1, 1953 7 Sheets-Sheet 6

INVENTOR
Bruce Roberts
BY
Synnestvedt & Lechner
ATTORNEYS

INVENTOR
Bruce Roberts
BY
Synnestvedt & Lechner
ATTORNEYS 2,812,948

MAGNETIC RECORDING

Bruce Roberts, Vermillion, Ohio, assignor to The International Electronics Company, Philadelphia, Pa., a corporation of Pennsylvania

Application September 1, 1953, Serial No. 377,947

9 Claims. (Cl. 274—4)

The present application is a continuation-in-part of my applications Ser. No. 717,754 filed December 21, 1946, now Patent No. 2,672,346, issued March 16, 1954; Ser. No. 740,653 filed April 10, 1947, now Patent No. 2,653,819, issued September 29, 1953; Ser. No. 278,212 filed February 8, 1952, now abandoned and Ser. No. 297,379 filed July 5, 1952, now Patent No. 2,743,317, issued April 24, 1956.

According to the disclosure of said application 717,754, a flat, rectilinear sheet of flexible material carrying a magnetizable substance is temporarily flexed to the form of a closed loop, preferably to the form of a cylinder, with one of the edges overlapping the opposite edge, thus providing what may be termed a continuous recording surface, which may be scanned in a continuous path or record track intersecting the line of contact of the two edges.

The invention is particularly adapted for use with record sheets whose resilience may vary from the limpness of tissue paper to the relative stiffness of a resin or composition sheet, for example, that of photographic film.

An object of the invention is to record intelligence magnetically in a continuous track on a flat rectangular record sheet which has been temporarily flexed to cylindrical form, and subsequently to reproduce the intelligence so recorded, notwithstanding the fact that the record sheet may, in the interim, have been restored to flat form, folded or creased.

A further object of the invention is to scan a helical track intersecting an edge of a record sheet which has been flexed to cylindrical form and to index the sheet on the form in order to provide for reregistration of the sheet on reinsertion in the same or a similar apparatus.

The invention also contemplates mounting a record on the record support in a manner to establish a driving connection between the support and the record sheet; to provide for reestablishing, upon reinsertion of a sheet in the machine, the alignment between the overlapped edges of the sheet which existed at the time of the recording; and to provide for reestablishment of the original relationship between a recorded track on the sheet and the reproducing head.

The invention, while adapted to the recording of intelligence of widely different forms, is especially adapted for use in recording and reproducing office dictation, in that it provides for very simple loading and unloading of record sheets, while preserving accuracy of alignment even with the limpest record sheets contemplated for use with the invention.

How these objects and others which will appear are attained may be more clearly understood upon reference to the three forms of apparatus described below and disclosed in the drawings, in which:

Figure 6 is a view of a portion of the mechanism of Figure 5;

Figure 7 is a view of a portion of the mechanism as disclosed in Figure 4;

Figure 11 is a simplified wiring diagram, applicable particularly to the second form of the machine, but also adapted to be employed with any of the forms of the machine;

All three of the forms of apparatus which are about to be described are adapted for use in recording and reproducing intelligence on flexible, rectangular record sheets carrying magnetizable material.

Such sheets comprise finely divided particles of magnetic material having high magnetic retentivity and high coercive force, dispersed in a non-magnetic binder, and preferably supported by a non-magnetic backing member.

While it is possible to record intelligence magnetically on a record medium comprising a homogeneous mass of magnetic material, it has been found that the desirable magnetic properties above enumerated are invariably accompanied in homogeneous sheets by undesirable physical properties. Magnetic materials having the requisite coercive force and retentivity tend to be so brittle and hard that it is difficult to work them by rolling or drawing, and, on the other hand, materials which are susceptible to fabrication tend to have inadequate retentivity and coercive force. Furthermore, even if record media are fabricated of materials having suitable magnetic characteristics, the physical properties of records so made are undesirable for the purposes contemplated herein. For example, a record sheet of carbon steel having only moderate retentivity and coercive force is still so brittle that attempts to fold it inevitably result in breaking the record.

Practical considerations of reasonable duration of a record within a limited physical size require that the sheet be scanned at a relatively low translational speed. As the scanning speed decreases, the output voltage of the reproducing head also decreases, since the voltage is proportional to the rate of change of the magnetic field. As a result, lower scanning speeds require more amplification and hence render the equipment more sensitive to extraneous noise. Indeed, attempts to employ a homogeneous sheet flexed to cylindrical form with opposite edges overlapped result in a particularly objectionable disturbance, in the nature of a click or plop, every time the overlapped edges pass the reproducing head. This phenomenon is apparently due to the concentration of the magnetic lines of force along the edge of the homogeneous metal sheet.

Figure 2:
Figure 2 is a fragmentary sectional view of a record sheet.

In contrast, records of the type shown in section in Figure 2, comprising finely divided particles of magnetic material dispersed in a flexible, non-magnetic binder, may be produced economically, and are resistant to a remarkable degree to the most severe treatment. Sheets of this character may be folded, creased, wrinkled, and otherwise distorted without interfering with their magnetic properties and without destroying or appreciably affecting in any way the quality of reproduction of a recording thereon.

Since the magnetic particles in sheets of the type described are effectively isolated, no concentration of the lines of force occurs at the edge of the sheet, with the result that the plop or click which is characteristic of a homogeneous sheet is completely obviated, despite the low speed and consequent high amplification employed in the practice of the invention.

However, it should be pointed out that sheets having dispersed magnetizable particles present certain problems which must be overcome if they are to be used as recording media. Primarily, the same flexibility and immunity to ill effects from distortion require novel handling techniques to reestablish the relative alignment of the portions of a record recorded on a sheet. Principal among these characteristics is the "limpness" of record sheets of the type under discussion. When it is realized that the sheets have a thickness of from 1 to 5 thousandths of an inch and an appearance and "feel" approximately equal to that of ordinary carbon paper, some appreciation of the problems involved will be realized.

Figure 1:
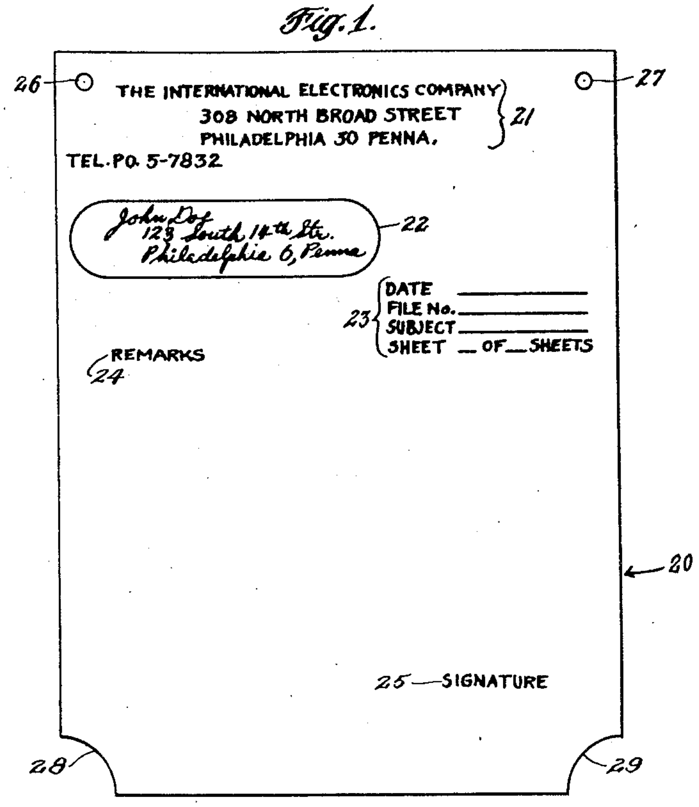
Figure 1 is a plan view of a record sheet adapted for use with the apparatus of the invention.

In Figure 1, I have illustrated in plan a record sheet 20 adapted for use in recording office correspondence, it being contemplated that records made in accordance with this aspect of the invention may be employed either as intermediaries between dictation and transcription of a letter, for example, to typewritten form, or may constitute the final form of letter to be transmitted to the recipient by mail and there reproduced by him in reproducing equipment of the type disclosed. The sheet bears on its uncoated side a letterhead 21, space for address 22, classification indicia 23, a heading 24, and signature location indicia 25.

The record sheet may be of any convenient size, depending on the nature and type of intelligence to be recorded, but preferably, for office dictation work, as illustrated in Figure 1, the sheet should be of standard letter size, for example, 8½" by 11". By standardizing on this size and shape of record sheet, all the auxiliary equipment of letter communication becomes available. For example, folded and creased sheets may be mailed in standard envelopes and may be filed in either flat or folded form in standard file folders, standard file cabinets, and the like.

In addition to the dimensions, the plan form of the sheet is characterized by holes 26 and 27 and notched corners 28 and 29, which together cooperate in maintaining the record sheet in scanning position in my novel recording apparatus. In addition, the holes provide a means for distinguishing one end of the sheet from the other, as will appear more fully hereinbelow. As shown in the sectional view of Figure 2, the sheet 20 comprises a flexible layer 30, comprising magnetizable particles, preferably supported by a flexible backing 31. The magnetizable material is preferably a material having a high magnetic retentivity and high coercive force, for example, Alnico-5, dispersed in a flexible non-magnetic binder, for example, a resin such as "Vinylite," a sheet of which is capable of being employed in the apparatus of the invention even without a backing member. The backing member 31, if one is employed, may advantageously be paper or some other material having the characteristics of great resistance to cracking upon folding and creasing and the ability to assume a substantially flat form after flexure to a closed loop, or after creasing. The binder for the magnetizable particles has similar properties, and therefore a record medium made in accordance with the invention is capable of repeated flexing to cylindrical form and of repeated creasing and uncreasing without disturbance of the bond between the magnetizable material and the backing member and without interference with the orientation of the individual magnetizable particles in relation to each other. The resilience of the material operates to restore it to flat form as it is released from the cylinder, which is not only advantageous for purposes of ultimate disposition, but also aids in removing the sheet from the machine, as will appear.

I have found that the best combination of the properties above discussed is obtained with a sheet of from about 1 to about 5 thousandths of an inch in thickness, and most desirably, with sheets from 2 to 3 thousandths of an inch thick.

Certain features of the recording sheet described above are fully disclosed and claimed in my copending application Serial No. 737,693 filed March 27, 1947, now Patent No. 2,668,718, issued February 9, 1954, and entitled Magnetic Letterhead.

Figure 3:
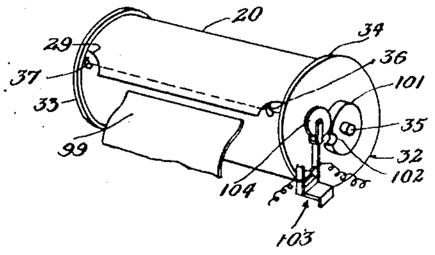
Figure 3 is a perspective view of the sheet of Figure 1 mounted upon the record support of the first form of the machine.

During recording and reproduction, a sheet 20 is supported upon a cylindrical form generally indicated at 32 in Figure 3. Cylinder 32 comprises a barrel of non-magnetic material, for example, brass, and two annular end flanges 33 and 34. Cylindrical form 32 is adapted to be mounted by means of a shaft 35 which protrudes beyond flanges 33 and 34 at either end.

Form 32 is provided with a pair of hooks 36 and 37 projecting from the barrel of the cylinder near the ends thereof in the same radial plane and adapted to engage the holes 26 and 27 in sheet 20. As may be seen, the hooks are inclined in the direction of normal rotation of the form, which inclination facilitates both engagement and disengagement of a sheet, as will appear.

The circumference of the barrel should be no greater than the length of sheet 20 and preferably the circumference should be somewhat less than the length of the sheet in order to provide for a slight overlap when the sheet is wrapped around the barrel, as shown in Figure 3. In dictation machines which are standardized on the basis of 8½" by 11" paper, the circumference of the cylinder is approximately 10½". Under these circumstances, notches 28 and 29 permit the paper to lie flat without interference from hooks 36 and 37, even though the notched or bottom end of the sheet overlaps the opposite end. The length of the cylinder between the flanges is precisely equal to the width of the paper—desirably 8½".

Figure 4:
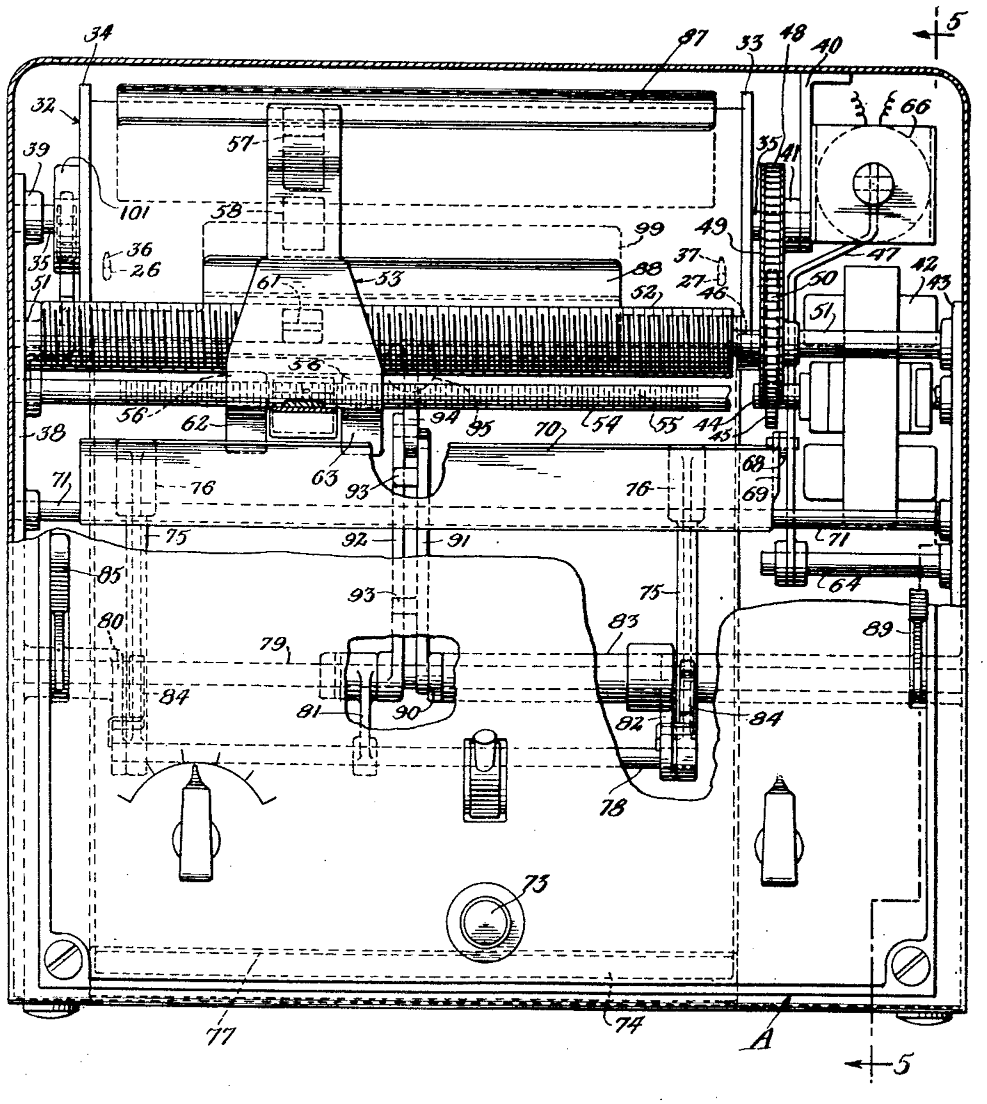
Figure 4 is a front elevation of the first form of machine with most of the front panel broken away.
Figure 5:
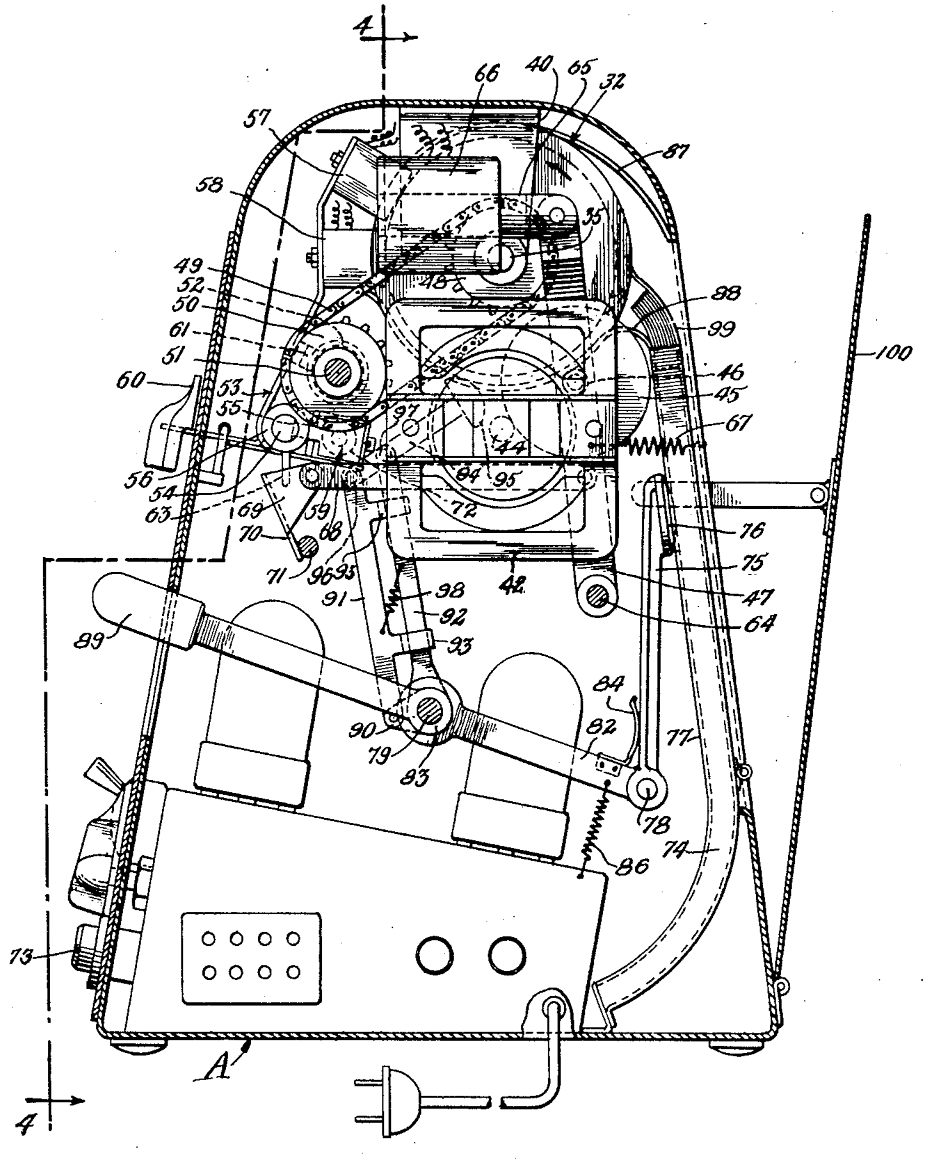
Figure 5 is a sectional view of the machine of Figure 4 taken along the line 5—5 of Figure 4.

In the first form of the machine, designated as "A" in Figures 4 and 5, cylindrical form 32 is mounted for rotation in the upper portion of the cabinet. The left end of shaft 35 (see Figure 4) is journalled for rotation in side frame 38 and a pad 39 formed integrally therewith. The opposite or right end of shaft 35 is journalled in bracket 40 and pad 41.

Immediately below shaft 35 and to the right of drum 32 may be seen driving motor 42 mounted on side frame 43. Motor shaft 44 is in peripheral engagement with drive plug 45 (see Figures 6 and 7) which is mounted for rotation with a shaft 46, which shaft is journalled in shift arm 47. The operation of arm 47 will be described more fully hereinbelow, but it should be observed at this time that motion of arm 47 is adapted to carry puck 45 into and out of engagement with motor shaft 44 and to carry puck shaft 46 into and out of engagement with flange 33 of form 32, thus providing a selectively engageable drive from motor 42 to form 32.

In addition to cylinder 32, shaft 35 also carries for rotation therewith a driving sprocket 48, located on the shaft between flange 33 and pad 41. Sprocket 48 carries a chain 49, which is in engagement with driven sprocket 50, of the same diameter as sprocket 48, secured to shaft 51 of lead screw 52, which has a single thread. Lead screw shaft 51 is journalled at its left end in side frame 38 and at the opposite end in side frame 43.

It will thus be seen that the drive train for all movable parts is: motor shaft 44, movable puck 45, puck shaft 46, flange 33, shaft 35, sprocket 48, chain 49, sprocket 50, shaft 51 and lead screw 52.

Lead screw 52 provides translational force for effecting movement of a portion of the mechanism axially of cylindrical form 32. This portion is mounted on a carriage 53, which is supported by and free for axial and rotational movement upon axial way 54 having a rack 55 cut along one side thereof. The actual bearing surfaces upon which the carriage rides are the internal surfaces of a pair of sleeves 56. Mounted on carriage 53 are erase head 57, rerecording head 58, back spacing mechanism generally indicated at 59, pointer 60, half nut 61, and a pair of tabs 62 and 63. According to the invention, the mass of carriage 53 and its associated parts is distributed around axial way 54 in a manner to retain heads 57 and 58 against the barrel of cylindrical form 32 and to retain half nut 61 in engagement with lead screw 52 by gravity. Tabs 62 and 63, which extend below axial way 54 provide levers to which torque moments may be applied to remove the heads from the cylinder and the half nut from the lead screw, as will appear more fully hereinbelow.

Both the rotational drive train and the oscillation of carriage 53 about axial way 54 are controlled by a single electromechanical control system which is clearly illustrated in Figures 6 and 7. Shift arm 47 is mounted for swing motion at its lower extremity on shaft 64, which provides a reaction point for the arm. At its upper end arm 47 is connected with armature 65 of solenoid 66, and intermediate its ends arm 47 carries puck shaft 46, discussed above, a spring 67 (see Figure 5), and cross arm 68.

Spring 67 normally tends to pull arm 47 toward the rear of the machine but exerts less force on the arm than does solenoid 66 when it is energized, with the result that the arm is held in its rearward position unless the solenoid is energized, under which condition it is pulled forward.

The front end of cross arm 68 is connected to tab 69 of trip bar 70, which is capable of rocking motion on shaft 71. As may be seen in Figure 4, trip bar 70 extends practically the full length of axial way 54, so that regardless of the position of carriage 53, trip bar 70 may be brought into position against tabs 62 and 63 of carriage 53. Figures 5 and 6 show the parts in the position they assume when solenoid 66 is energized, that is, with drive puck 45 in driving position and trip bar 70 rocked forward, permitting the recording heads 57 and 58 to contact sheet 20 on cylinder 32 and permitting half nut 61 to engage with lead screw 52. Under these conditions the cylinder rotates and the carriage is moved axially of the cylinder by the lead screw. Now, if the circuit to solenoid 66 be broken, spring 67 will pull arm 47 rearwardly, disengaging the drive puck and rocking trip bar 70 to the rear. The trip bar, as will be seen, comes in contact with one or both of tabs 62 and 63, exerting a torque moment on carriage 53 around axial way 54, thus lifting the heads from the sheet and removing half nut 61 from engagement with lead screw 52.

The combination of the rotating-scanning component effected by rotation of cylinder 32 and the translating component effected by translational movement of carriage 53 on axial way 54, provides means for effecting movement of the recording head relative to the recording medium in two directions substantially normal to each other. The interrelation of these two components makes possible the scanning of the entire record area in a series of side-by-side track portions. Preferably, the two components are interrelated in a manner to provide for simultaneous translational and rotational movement, whereby to provide for a continuous helical track intersecting the line of overlapping of the opposite edges of the record sheet.

A second control system 59 is carried by carriage 53 and serves to effect back spacing. This mechanism is shown and described in detail in my copending application Serial No. 717,754, above identified and also in my copending application, Serial Number 737,694, entitled Back Spacing Device for Dictating Machine, filed March 27, 1947, now Patent No. 2,581,499 issued January 8, 1952. As therein described, this mechanism includes a solenoid 72 and a pawl actuated thereby adapted to engage with rack 55 on axial way 54 to provide for step-by-step back spacing of carriage 53 on axial way 54. In Figure 4 is disclosed a push button switch 73 for controlling solenoid 72.

The record sheet loading mechanism includes a reservoir 74 in the back of the machine, adapted to contain a number of sheets 20 oriented with their leading edges, as indicated by the holes, toward the cylinder. A pair of paper fingers 75, having pads 76, is adapted to engage the forward sheet 20 in reservoir 74 through slots in the forward wall 77 of the reservoir. Fingers 75 are secured at their lower ends to a shaft 78, which is hung from a second shaft 79 by three arms, 80, 81, and 82. Arms 80 and 81 are secured to shaft 79 for rotation therewith, while arm 82 is loosely mounted for rotation on a sleeve 83 concentric with shaft 79. Each finger 75 is provided with a spring 84 which acts to force finger 75 against the paper. Rotation of shaft 79 is effected by moving lever 85 (see Figure 4). As will be seen, depressing lever 85 forces finger 75 upwardly against the tension of spring 86 (see Figure 5), and since pads 76 are coated to provide more friction between them and the sheet of paper 20 they contact than exists between that sheet and the adjacent sheet, the sheet is raised to a position where its upper edge enters the space between paper guide 87 and drum 32. As the cylinder rotates, hooks 36 and 37, which are inclined forwardly in the direction of normal rotation of cylinder 32, enter holes 26 and 27 in sheet 20, drawing the sheet from the reservoir and wrapping it around the cylinder. Paper guides 87 and 88 maintain the sheet in its flexed form on cylinder 32.

The paper ejection mechanism includes sleeve 83, above referred to, rotatably mounted on shaft 79, and which is secured at one end to lever 89 (see Figure 4) and at the other to a crank 90 carrying a link 91. Adjacent link 91 is link 92, loosely mounted for rotation on shaft 79. Links 91 and 92 are kept in substantial axial alignment by pairs of loose fitting guides 93 formed on link 91. An ejection lever 94, carrying a pad 95, is secured to links 91 and 92 at 96 and 97 respectively. When lever 89 is depressed, crank 90 rotates in a manner to shift link 91 downwardly relative to link 92 against the tension of spring 98, raising pad 95 and moving it into engagement with drum 32 through a slot in paper guide 88. When the pad can no longer swing upwardly, the whole assembly, consisting of crank 90, links 91 and 92, lever 94 and pad 95, will pivot about shaft 79, spinning drum 32 in a reverse direction (clockwise as viewed in Figure 5). Since the paper 20 on drum 32 has a natural tendency to straighten out, the sheet will be stripped off by outside back wall 99 of reservoir 74 and be deposited between wall 99 and adjustable back panel 100. The inclination of the hooks in the direction of normal rotation facilitates disengagement of the sheet from the cylinder.

In Figures 3 and 4 I have illustrated mechanism for stopping the drum in a predetermined position prior to operating the ejection mechanism, in order to insure that the trailing edge of sheet 20 will be in the proper angular position in relation to back wall 99 of magazine 74. This mechanism (see Figure 3) includes a cam 101, mounted on drum shaft 35 adjacent one end of drum 32. Cam 101 has a circular profile interrupted by a depression 102. Switch 103 includes a rotating cam follower 104, adapted to separate the switch contacts when it drops into depression 102. Switch 103, together with an ejection push button, serves to provide a path for energizing current for cylinder drive engaging solenoid 66. This circuit is completely independent of the normal operating circuit for solenoid 66, as will appear below in the description of the corresponding circuit of the B form of the invention. When it is desired to eject a sheet, the ejection switch is closed by the operator and solenoid 66 will be energized so long as cam follower 104 is in contact with the high portion of cam 101. As a result, the cylinder will rotate in the normal direction until follower 104 drops into depression 102, separating the switch contacts and deenergizing solenoid 66. The cylinder, therefore, will stop in a position determined by the angular location of the depression. This angular position is arranged to correspond with a position of the trailing edge of sheet 20 appropriate to ejection in the desired direction. Preferably, as in the form illustrated, the depression is arranged to stop the cylinder when the trailing edge of sheet 20 is somewhat past the edge of rear wall 99 of the paper magazine, which strips the sheet from the drum on reverse rotation thereof. Once the drum has been rotated to and stopped in this position, the paper is ejected by operation of lever 89, as described above.

Figure 8:
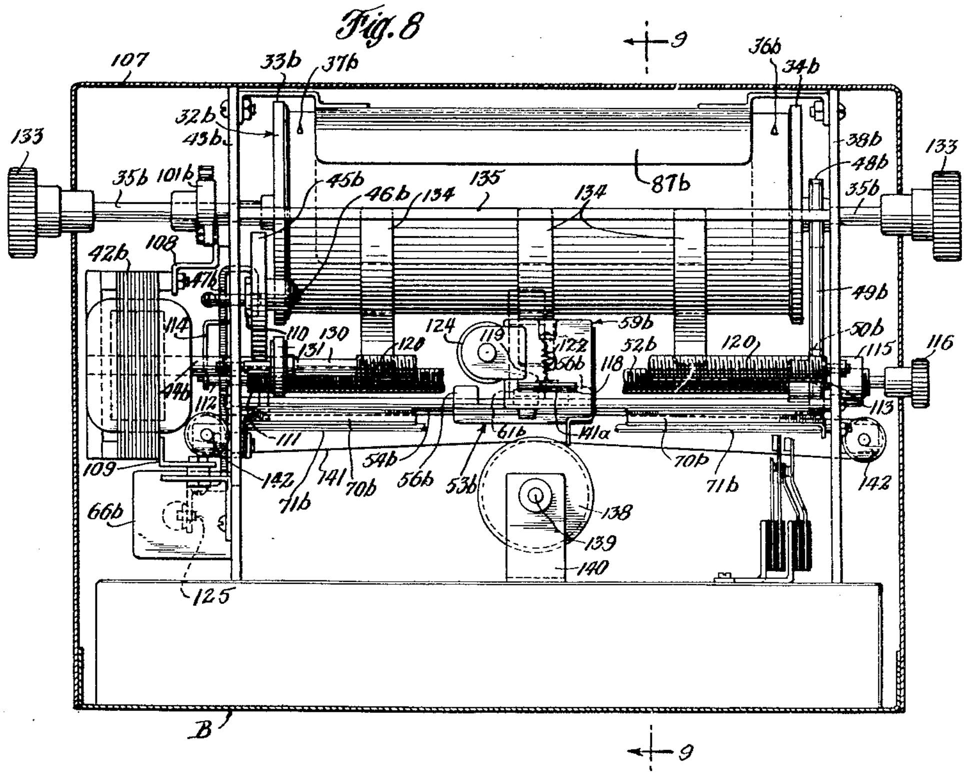
Figure 8 is an elevation of the second form of machine with the front of the case removed.
Figure 9:
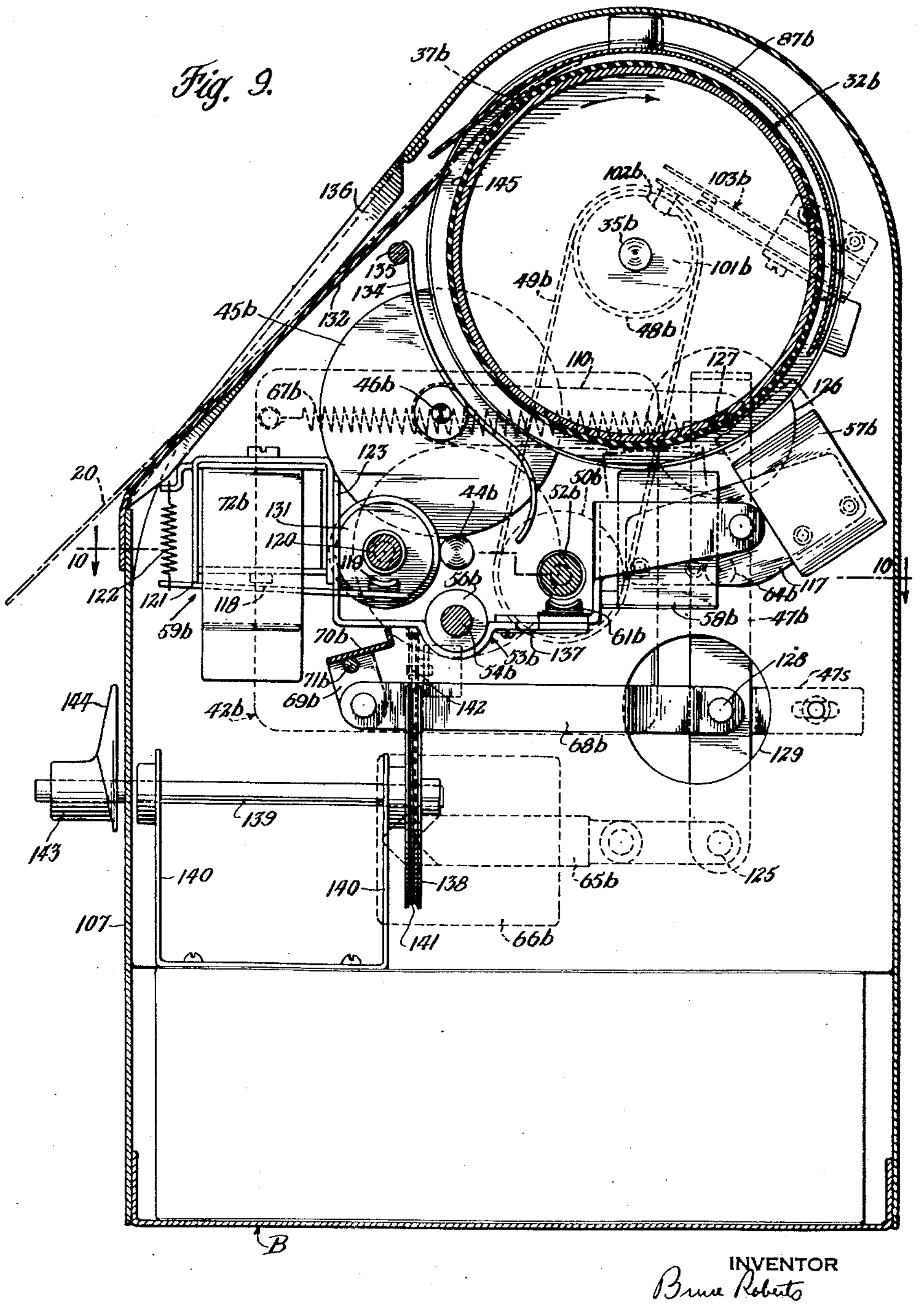
Figure 9 is a sectional view on an enlarged scale of the machine of Figure 8 taken along the line 9—9.

Turning now to the second form of machine indicated at "B" in Figures 8 and 9, it will be seen that a cylindrical form **32*b* is mounted for rotation in the upper portion of a cabinet 107. Form 32*b* is carried on a shaft 35*b* which is journalled for rotation in frames 43*b* and 38*b* at the left and right respectively. Immediately below shaft 35*b* and to the left of drum 32–*b* may be seen driving motor 42*b* secured to frame 43*b* by means of brackets 108 and 109. As may be seen in Figure 9 motor shaft 44*b* is in peripheral engagement with drive puck 45*b* which is mounted for rotation with a shaft 46*b*, which shaft is journalled in a transverse shift arm 110. Motion of arm 110 is adapted to carry puck shaft 46*b* into and out of engagement with flange 33*b* of form 32*b*, thus providing a selectively engageable drive from motor 42*b* to form 32*b***.

Figure 10:
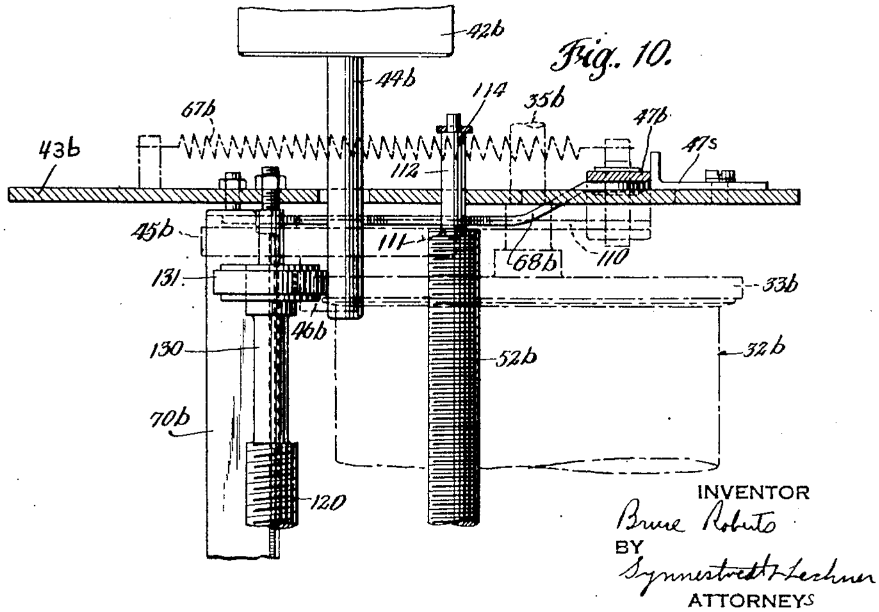
Figure 10 is a plan section of a portion of the mechanism disclosed in Figure 9 taken along the line 10—10.

Shaft **35*b* also carries for rotation therewith a driving sprocket 48*b*, located on the right end of the shaft between flange 34*b* and frame member 38*b*. Sprocket 48*b* carries a chain 49*b* which is in engagement with a driven sprocket 50*b*, secured to lead screw 52*b*. Each end of lead screw 52*b* is provided with a conical depression 111 (see Figure 10) adapted to cooperate with a pair of pointed pins 112 and 113. Pin 112 is biased towards lead screw 52*b* by a spring 114. Pin 113, which engages depression 111 at the right end of lead screw 52*b*, is threaded in a fixed nut 115 and adapted to be rotated by a knob 116. Rotation of pin 113 in nut 115 results in axial movement of the pin in relation to the fixed elements of the machine, and thus provides for axial adjustment of the position of lead screw 52*b***.

Lead screw **52*b* provides translational force for carriage 53*b*, which is supported upon axial way 54*b* with freedom for axial movement and also for oscillation thereon. The actual bearing surfaces upon which the carriage rides are the internal surfaces of a pair of sleeves 56*b*. Carriage 53*b* carries an erase head 57*b*, and a recording head 58*b*, supported by an equalizer arm 117. Carriage 53*b* is also provided with a half nut 61*b* adapted to engage with lead screw 52*b*, and in addition carries backspacing means generally indicated at 59*b* comprising a solenoid 72*b*, and armature 118 carrying a half nut 119, which is adapted to engage with reverse lead screw 120. Armature 118 is arranged with freedom for oscillation in a vertical plane about an edge 121, but is normally biased away from solenoid 72*b* by a spring 122. Armature 118 is held as against movement transverse the axis of solenoid 72*b* by virtue of the fact that it penetrates a vertical slot in solenoid support member 123. As may be seen, therefore, energization of solenoid 72*b* lifts armature 118, bringing half nut 119 into engagement with reverse lead screw 120, thus effecting back spacing of carriage 53*b* on axial way 54*b*. It should also be noted at this time that the head assembly, comprising heads 57*b* and 58*b*, on the one hand and the back space assembly on the other form a lever having axial way 54*b* as a fulcrum. The back space end of the lever (the left end as viewed in Figure 9) also includes a counterweight 124 which may be seen in Figure 8. The mass of the counterweight and back space mechanism, together, is sufficient to raise heads 57*b* and 58*b* into engagement with a record sheet supported on record support 32*b***.

The position of oscillation of carriage **53*b* about axial way 54*b*, as well as the position of engagement of drive puck 45*b*, is determined by a control system which will now be described. Referring first to Figure 8, it will be seen that in the space between frame member 43*b* and the end of cabinet 107 is mounted a solenoid 66*b*, having armature 65*b* (see Figure 9) pivotally connected to a shift arm 47*b* by a pin 125. Arm 47*b* is mounted for oscillation about pin 64*b*. At its upper end arm 47*b* has a double bend (see Figure 8), the horizontal portion of which penetrates an aperture 126 in frame 43*b* and whose reverse portion is connected to cross arm 110 by a pin 127. Intermediate mounting pin 64*b* and pin 125, shift arm 47*b* is also connected to cross arm 68*b* by a pin 128. Cross arm 68*b* penetrates an aperture 129 in frame 43*b* and is connected at its opposite end to crank 69*b* of shift bar 70*b*. Shift bar 70*b* extends the full length of axial way 54*b* and is mounted for oscillation on a shaft 71*b*. Shift bar 70*b* if of L section, the short arm of the L being adapted to raise the front arm of carriage 53*b*, whatever the position of the carriage on axial way 54*b*. A spring 67*b* biases shift arm 47*b* in a manner to maintain the parts in the position indicated in Figure 9, that is, with drive puck 45*b* out of engagement with drum 32*b* and with the short arm of shift bar 70*b* raised to a position in which half nut 61*b* is lowered out of engagement with forward lead screw 52*b*. Upon energization of solenoid 66*b*, however, shift arm 47*b* oscillates on pivot 64*b* against the tension of spring 67*b*, pulling drive puck 45*b* (by means of cross arm 110) into engagement with form 32*b*, and also rocks shift bar 70*b* on shaft 71*b* in a manner to permit the front of carriage 53*b* to drop and thus bring half nut 61*b* into engagement with lead screw 52*b*. The rotating and translating components of the scanning movement, therefore, are both controlled by operation of solenoid 66*b*. A permanent adjustment of the clearances in the control system may be made by locking adjustable stop member 47*s* (see Figures 9 and 10) in a position to limit the oscillation of shift arm 47*b*** in the disengaging sense.

Back spacing is accomplished by energization of solenoid **72*b*, which brings half nut 119 into engagement with reverse lead screw 120, as described above. Lead screw 120 is mounted on a shaft 130, which shaft is journalled in frames 43*b* and 38*b*. In addition to reverse lead screw 120, shaft 130 also carries reverse puck 131, which is in constant engagement with motor shaft 44*b* and which, therefore, provides for constant rotation of reverse lead screw 120**.

Cabinet 107, which is of generally rectangular plan, has a sloping front surface. The inclined front portion of the machine is depressed to form a panel 132 of the same width as a record sheet, that is, about 8½". Panel 132 forms the bottom of a feed channel whose sides are defined by guide lips 136 projecting inwardly in the planes of flanges **33*b* and 34*b* of form 32*b*. To load the machine, a sheet 20 is laid against panel 132 with its top edge toward the cylinder and slid upwardly, being guided by lips 136 into engagement with cylinder 32*b*. Since panel 132 is parallel to a plane containing the axis of cylinder 32*b*, the sheet is fed onto the cylinder with its leading edge parallel to the axis. Concurrently, drum 32*b* is rotated by means of one of the knobs 133 or by energizing solenoid 66*b* until hooks 36*b* and 37*b* penetrate holes 26 and 27 in sheet 20, whereupon the sheet is drawn around the drum between upper guide member 87*b* and the drum, and is wrapped therearound. In addition to upper guide 87*b*, I have provided three spaced guides 134**, in the lower front quadrant, supported by transverse element 135. As the sheet rotates, the trailing edge, after it clears heads 57*b* and 58*b*, tends to drop to a tangent position below the drum, and it is the purpose of guides 134 to prevent the sheet from trailing into the mechanism below. As the trailing edge comes back into contact with drum 32*b*, tapered flanges 33*b* and 34*b* realign it with the leading edge. Once the sheet has been wrapped on the drum as above described, scanning of the sheet may be commenced by energizing solenoid 66*b*, which initiates rotation of the cylinder and forward motion lead screw, and engagement of the forward motion half nut as above described.

It should be pointed out at this time that drum 32*b* is provided with a cushion 145 of resilient material such as rubber, that half nut 61*b* on carriage 53*b* is yieldingly pressed against lead screw 52*b* by a spring 137, and that heads 57*b* and 58*b* are free for movement toward and away from the drum, so that the contact between the heads and a record sheet mounted on the drum may be maintained at constant pressure. When an inequality such as the line of overlapping of the two ends of a sheet, or an eccentricity of form 32*b*, approaches a head, the head in question may rock back relative to the other head and the entire carriage 53*b* may rock to a lesser extent about axial way 54*b*, all without interfering with the intimacy of contact of half hut 61*b* wtih lead screw 52*b*, since spring 137 maintains half nut 61*b* in contact with the lead screw despite minor variations in the relative positions of the lead screw and the carriage.

Although the cylinder and head mounting of the A machine disclosed in Figures 4 and 5 may be employed with the B machine, there are certain advantages in employing the cylinder and head mounting illustrated in Figures 8 and 9, the head mounting being fully disclosed and claimed in copending application of Chester C. Pond, entitled "Equalizer for Supporting Magnetic Recording and Erasing Heads," Serial Number 743,806 filed April 25, 1947, now Patent No. 2,530,029, issued November 14, 1950.

In Figures 8 and 9 may be seen the mechanism which performs the function of indicating the extent of recording and which also provides for rapid shifting of carriage 53*b* on axial way 54*b*. This mechanism includes a capstan 138, having a shaft 139, which shaft penetrates the front of cabinet 107 and is supported by and journalled in a bracket 140. Wound around capstan 138 is a cord 141, which runs from the capstan toward the right to an idler pulley 142, thence to a point of attachment 141*a* on carriage 53*b* then to a second idler 142 at the left of the machine, and thence back to capstan 138. Shaft 139 is provided with a knob 143 having a pointer 144. During operation of the machine, as carriage 53*b* progresses along axial way 54*b*, cord 141 rotates capstan 138, shaft 139 and knob and pointer 143 and 144, thus giving an indication of the position of the carriage along axial way 54*b*. In addition, knob 143 provides a means for rapidly shifting the position of carriage 53*b* when desired, for example, when back spacing, or when returning the carriage preparatory to scanning a new record.

As may be seen in Figure 9, I have provided a cam 101*b* and switch 103*b*, similar in arrangement to the automatic stop mechanism fully described in connection with the A form of the invention, Figure 11 discloses the circuit for this stop mechanism, as well as other control and voice circuits contemplated by the invention.

In Figure 11 may be seen a main power switch 146, which serves to energize motor 42*b* and rectifier unit 147. Rectifier unit 147 not only supplies direct current for operation of solenoids 66*b* and 72*b*, but also provides plate and filament current for an amplifier 148. The negative direct current lead from rectifier 147 is connected through section 150 of gang switch 149, either directly to ground or to ground through erase head 57*b*. Thus, when switch 149 is in position 1, the direct current path to all of the components from rectifier 147 includes section 150 of switch 149 and erase head 57*b*.

Sections 151 and 152 of switch 149 serve to connect speaker-microphone 153 and record-reproduce head 58*b* alternatively to the input and output of amplifier 148. Thus, in position 1 of switch 149, speaker-microphone 153 is connected to the amplifier input, record-reproduce head 58*b* is connected to the amplifier output, and erase head 57*b* is energized by virtue of the fact that the negative direct current supply is completed therethrough. When switch 149 is shifted to position 2, the record-reproduce head 58*b* is connected to the amplifier input, speaker-microphone 153 is connected to the amplifier output, and the negative direct current connection from rectifier 147 is made directly to ground. It will be seen, therefore, that position 1 of switch 149 corresponds to recording conditions and position 2 corresponds to reproducing conditions.

Switch 106*b*, which may advantageously be a foot switch, when closed energizes solenoid 66*b*, commencing scanning of a record on form 32*b*. Push button switch 73*b* controls the operation of reverse solenoid 72*b*, and push button switch 105*b* controls the drum orientation mechanism described above by energizing solenoid 66*b* through switch 103*b* independently of the main operating switch 106*b*. While I have disclosed, in my copending application, Serial Number 717,754, above identified, a complete circuit diagram for the A form of the invention, the invention also contemplates that the circuit of Figure 11 may be employed with all of the forms herein disclosed.

Figures 12, 13, 14:
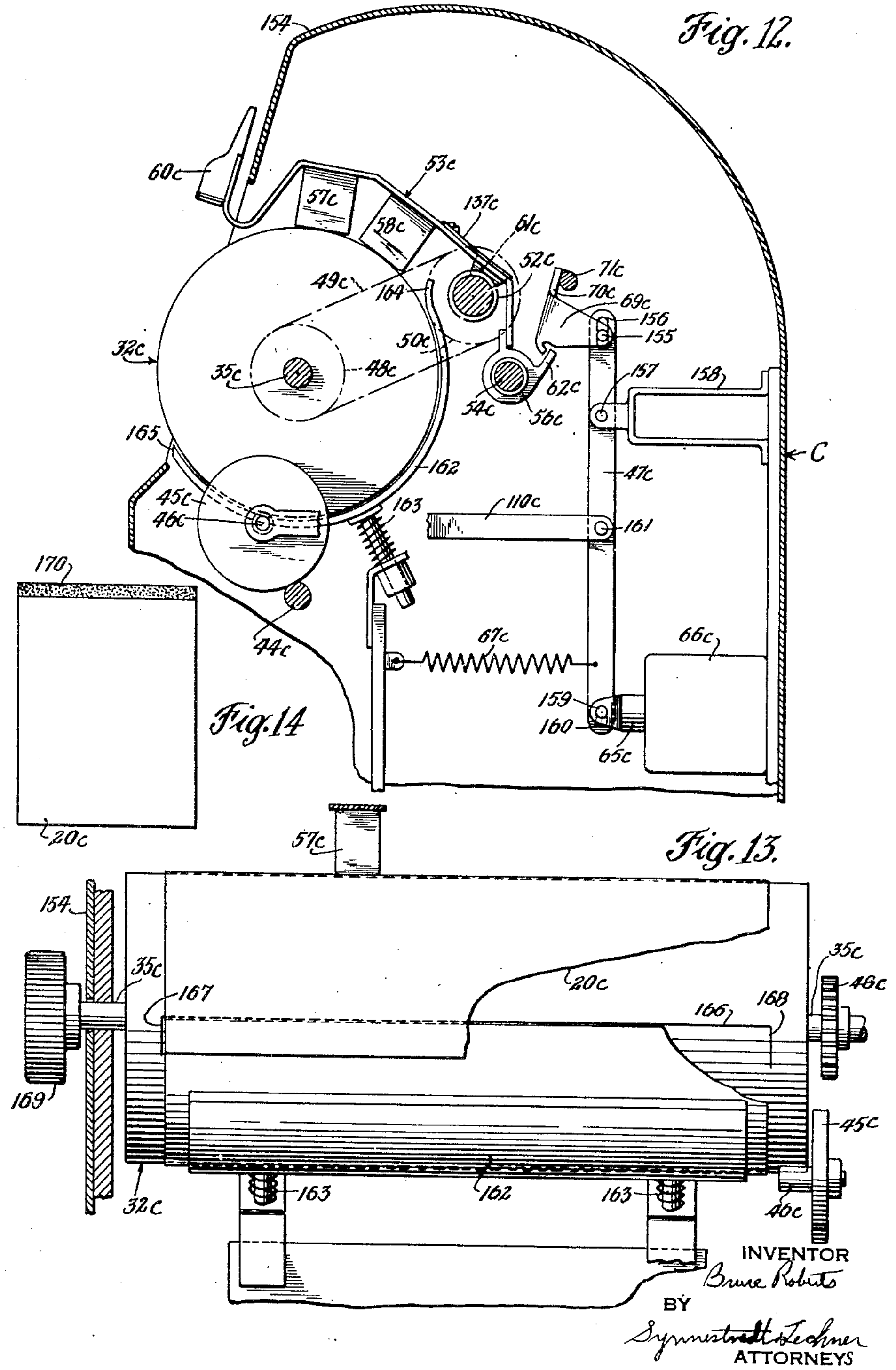
Figure 12 is a vertical sectional view of a third form.
Figure 13 is an elevation of portions of the machine of Figure 12.
Figure 14 is a plan view on a reduced scale of a record sheet particularly adapted for use with machines of the third form.

Turning now to the form of the invention illustrated at "C" in Figure 12, it will be seen that this machine is housed in a cabinet 154 in a manner to partially expose drum 32*c*. Drum 32*c* is mounted for rotation on a shaft 35*c*, which shaft is journalled in the side panels of cabinet 154. Shaft 35*c* carries at its right hand end for rotation therewith a drive sprocket 48*c* having a chain 49*c* in engagement therewith, which chain also engages a driven sprocket 50*c*, driveably associated with a lead screw 52*c*. Lead screw 52*c* is mounted for axial adjustment relative to cylinder 32*c* in the same manner as is lead screw 52*b* in the B form of the invention, above described.

An axial way 54*c* extends parallel to the axis of cylindrical form 32*c* and carries thereon a carriage 53*c*. Mounted on carriage 53*c* are erase head 57*c*, record-reproduce head 58*c*, a half nut 61*c*, yieldingly held against lead screw 52*c* by a spring 137*c*, and a pointer 60*c* adapted to traverse a scale on the outside of cabinet 154. Pointer 60*c* also provides means for manually adjusting the position of carriage 53*c* axially of form 32*c*.

Carriage 53*c* also comprises a sleeve 56*c* having a tab 62*c* adapted to be engaged by shift bar 70*c*, which bar is mounted for oscillation with shaft 71*c*. Shift bar 70*c* is provided with a crank 69*c* which is connected to the upper end of shift arm 47*c* by a pin 155, which engages a slot 156 in arm 47*c*. Arm 47*c* is mounted for oscillation on a pin 157 supported by a standard 158 and is connected at its lower extremity to armature 65*c* of solenoid 66*c* by a pin 159, penetrating a slot 160 in arm 47*c*. Intermediate pins 157 and 159, shift arm 47*c* is pivotally connected to a cross arm 110*c* by a pin 161. Journalled in the opposite end of cross arm 110*c* is a shaft 46*c*, carrying drive puck 45*c*, which is in constant peripheral engagement with shaft 44*c* of a driving motor, not shown. Shift arm 47*c* is biased by a spring 67*c*, anchored to a fixed bracket, which spring normally tends to hold shaft 46*c* of driving puck 45*c* out of engagement with drum 32*c* and also imposes a torque moment on tab 62*c* of carriage 53*c* in a sense to disengage heads 57*c* and 58*c* from drum 32*c* and half nut 61*c* from lead screw 52*c*. Energization of solenoid 66*c*, however, shifts arm 47*c* in a sense to driveably engage shaft 46*c* of puck 45*c* with drum 32*c*, and throws shift bar 70*c* out of engagement with tab 62c, permitting heads 57c and 58c to engage drum 32c and half nut 61c to engage lead screw 52c, all by gravity.

The machine is provided with a guide 162, which is yieldingly pressed against drum 32c by springs 163. Guide 162 extends axially of drum 32c and is provided at one edge with a lip 164 to adapt it to receive the leading edge of a record sheet supported on drum 32c and at the opposite edge with a stripper blade 163 adapted to assist in removing a sheet from the drum on reverse rotation thereof, as will appear.

Turning now to Figure 13, it will be seen that drum 32c is provided with an index line 166, extending axially of the drum to provide for peripheral registration of the leading edge of a record sheet 20c and also with a pair of index lines 167 and 168, extending circumferentially of drum 32c to provide for axial registration. A knob 169, keyed to shaft 35c, provides for manual rotation thereof and hence of drum 32c.

This form of machine is adapted for use with record sheets of the type disclosed at 20c in Figure 14. This sheet is characterized by the magnetizable coating discussed above in connection with sheet 20, and also, on the reverse side, by a strip of pressure-sensitive adhesive material 170, which is adapted to removably secure a sheet 20c to drum 32c. The presence of the adhesive also serves to identify the top of the sheet. In operation, the drum 32c is manually rotated to a position in which index lines 166, 167 and 168 are exposed, whereupon a sheet 20c is placed in contact with the drum with its leading edge in alignment with index line 166 and the adjoining edges in alignment with index lines 167 and 168. Pressure is then applied with finger to secure the leading edge of the sheet to the drum in that position, whereupon rotation of the drum is effected by means of knob 169 until sheet 20c is wrapped around drum 32c with its trailing edge lapped over the leading edge, after which scanning is commenced by energizing solenoid 66c, which, as described above, initiates rotation of drum 32c and translational movement of carriage 53c.

Back spacing of carriage 53c is effected by grasping pointer 60c with the fingers and moving carriage 53c on axial way 54c. To remove the sheet, drum 32c is rotated in a forward direction until the trailing edge of the sheet is in an exposed position, whereupon the drum is rotated in a reverse direction by means of knob 169. The trailing edge of the sheet, since it has a natural tendency to straighten out, separates somewhat from drum 32c and is engaged by stripper edge 165 of guide 162. The trailing edge of the sheet may then be seized with the fingers, and by concurrent tension on the sheet and rotation of drum 32c, the adhesive joint between the sheet and the drum will be brought into contact with edge 165, which will effect separation of the sheet and drum, thus freeing the sheet. When it is desired to reproduce a record made in accordance with the above procedure, the sheet is again carefully registered relative to lines 166, 167, and 168, and the loading procedure repeated, upon which the sheet will be restored to the position it occupied during recording.

Each form of the invention, above described, provides means for positioning a previously recorded sheet in the apparatus in a manner to permit reproduction of the intelligence recorded thereon without regard to the intervening history of the sheet.

Such positioning involves first, establishing a driving connection between the record support and the record sheet; second, reestablishing the alignment between the overlapped edges of the sheet which existed at the time of recording; and third, providing for reestablishment of the original relationship between a recorded track on the sheet and the reproducing head.

In the A and B forms of the machine, the driving connection between the drum and the sheet is achieved through the interengagement of the hooks on the drum and the corresponding holes in the sheet. This arrangement not only provides for securing the leading portion of the sheet to the drum, but also positions the sheet accurately both peripherally and axially of the drum, which is of importance for the reasons set out below.

In the C form of the invention, the connection between the record support and the record sheet is achieved through the use of an adhesive deposited on the reverse side of the leading portion of the record sheet. In this form of the invention, the axial and peripheral positions of the sheet is determined by indexing the sheet relative to index lines formed on the drum.

When a helical track is recorded on a sheet mounted on the support in the manner described, each turn of the helix is intersected by the line of overlapping. Upon reinsertion of a sheet in the machine after removal, the trailing portion of each turn must be accurately aligned with its corresponding leading portion. According to the invention, this is accomplished primarily by registering the sheet on the drum with one axis (that is, with the leading edge) parallel to the axis of the support. Since the trailing edge is parallel to the leading edge, when the sheet is wrapped upon the support and assumes the form of a cylinder of uniform length (determined by the width of the sheet) the trailing edge falls into a position of alignment with the leading edge. This result is enhanced by the action of the head and guide elements which "wipe" the trailing edge into its position relative to the leading edge even after creasing of a sheet.

In addition, the flanges on the drums of the A and B machine aid in aligning the sheet axially of the cylinder throughout its length. The tapered characteristic of the flanges of the B machine (which may also be used in the A machine) are particularly effective in guiding the sheet onto the surface of the drum, engaging both layers of the sheet in the area of overlapping, and thus accurately maintaining the axial adjustment of one layer relative to the other.

The reestablishment of the alignment between a record track and the recording-reproducing head is accomplished in the A and B machines by the mechanical indexing action of the end flanges, which, together with the fact that the lead screw and drum are effectively keyed together by the lead screw drive chain, means that whatever the relative rotational position of the drum when a sheet has been reinserted, the head elements will be in scanning contact with a track previously recorded. By accurately positioning the sheet axially of the cylinder by reference to the index lines in the C form of the machine, the same result is accomplished. In addition, I have provided in the B and C machines, mechanism, applicable to all forms, for effecting axial adjustment of the lead screw relative to the record support. By manipulation of the lead screw adjustment knob, it is possible to "tune in" a record track which is not in accurate alignment with the reproducing head. This is useful in any of the machines when extremely adverse weather conditions may have affected the physical dimensions of the sheet, and is also of great value in the C form of the machine, since it obviates the necessity of extreme accuracy in indexing the sheet both axially and peripherally of the record support. By "tuning in" is meant the operation which consists of inserting a recorded sheet into the machine, adjusting the machine for reproduction, and then manipulating the lead screw adjustment knob for maximum volume. It is contemplated that the factory alignment of the device will include an adjustment of the axial position of the lead screw, as above described, to compensate for the collective manufacturing clearances in the record translating mechanism.

Another general consideration which is met by all forms of the invention is the matter of accommodating, between the head elements and the drum, the leading edge of a sheet upon insertion, the overlapped edges of the sheet and other inequalities in the effective radius of the recording surface.

In the A form of the machine, the entire carriage is free for oscillatory movement about the axial way, the heads being maintained in contact with a record on the support by gravity, with freedom for what is effectively radial movement toward and away from the cylindrical record surface. When the leading edge of a sheet being inserted penetrates the nip between the support and the pole pieces, the head and carriage are slightly displaced to accommodate it. Similarly, the carriage rocks each time the overlapped portions of the sheet pass under the recording heads. The heads and carriage are also free to oscillate on the axial way as a result of any eccentricity in the record support itself. In the B form of the machine, in addition to the freedom for oscillatory movement of the carriage about the axial way, above described, the heads have freedom for difference movement by virtue of their mounting upon an equalizer arm. The amount of movement required to accommodate, for example, an edge of the sheet, is less than in the case of the A machine by virtue of the fact that the record support in the B machine includes a cushion of resilient material which may be depressed to a greater or lesser extent, depending upon the local pressure of contact between the record sheet and the surface of the cushion.

As was pointed out in the descriptive portion of this specification, motion of the carriage of the B form about the axial way may take place without effect upon the interengagement of the forward motion lead screw and its cooperating half nut, by virtue of the resilient mounting of the half nut, which tends to keep it in enagement with the lead screw irrespective of minor variations of position of the carriage relative to the lead screw. In the C form of the machine, the entire carriage is again free for movement about the axial way and the half nut here is also spring pressed against the lead screw to render it independent of small variations of position of the carriage.

It should be noted at this time that all of the machines are arranged to provide for scanning of a record track across the line of overlapping in a direction from the upper layer to the lower layer. Since the upper layer is therefore under tension, there is no possibility of entanglement of an edge with the heads as would be the case were rotation effected in the opposite direction, that is, with the upper layer the leading edge. As a consequence of scanning the sheet in this direction, it is possible to bias the heads against the record with sufficient pressure to maintain an intimacy of contact adequate for faithful reproduction. In all of the forms of the machine disclosed herein, the heads are maintained against the record surface by gravity. The cushion illustrated in the B form of the invention aids in preserving this intimacy of contact by permitting a slight distortion of the record surface in the immediate vicinity of the pole pieces, thus permitting contact throughout an area rather than in a single point or line as would be the case if the recording surface is absolutely unyielding. Of course, the record sheets themselves, thin as they are, afford some cushioning effect.

It will also be noted that in each of the machines illustrated I have disclosed non-rotating guide elements for maintaining the record sheet in substantial contact with the record support, at least throughout a portion of the circumference of the support. These guides, which may be, as in the A and B machines, fixed at some little distance from the support, or, as in the C machine, spring-held against the support, not only serve to prevent the trailing edge of the sheet from becoming entangled with other parts of the apparatus, but also assist in "ironing out" wrinkles and creases in the sheet which, in turn, insures accurate peripheral alignment of the overlapping portions of the sheet. They also assist in reestablishing axial alignment of the overlapping portions of the sheet by forcing the sheet to conform to the cylindrical surface of the support and thus to assume a shape congruent to the support and, therefore, to assume the same position whenever again reintroduced into the machine.

In the A form of the invention, I have provided means for feeding sheets from a first station comprising a reservoir to a position of engagement with the support, to guide the sheet while on the support, and finally, to guide the sheet from the support to a second reservoir upon completion of scanning. It will thus be seen that the invention contemplates guiding sheets not only while on the record support, but also to the record support and from the record support. In the B form of the invention, the record guide path is defined in part by elements formed integrally with the case, which elements not only constitute a feed path to the machine, but also define the path of a record being ejected from the machine.

In the C form of the invention, I have illustrated a mechanism in which the feeding of a record to the support is effected manually, the registration being accomplished by visual means, as described above. However, the C form does include, as do all the others, means for engaging the trailing edge of the record sheet upon reverse rotation of the record support. This is especially desirable when employing sheets which are adhesively secured to the record support, since the stripper assists in disengaging and separating the adhering portions of the record sheet and support.

In all forms of the invention, the stripper plate assists in deflecting the trailing edge of the sheet away from the support upon reverse rotation thereof, and in the A and B forms assists in clearing the sheet of the hooks, whose inclination in the direction of normal rotation automatically brings about disengagement upon continued rotation of the support past the radial position in which the record sheet is engaged by the stripper plate.

The operation potentialities of the invention may best be appreciated upon consideration of a brief description of certain aspects of operation. The initial installation of any of the forms of the invention herein disclosed involves no more than locating the equipment at a point convenient to the person who is to operate it, connecting it to a source of electrical current, plugging in a speaker-microphone, and a foot switch for controlling the drive-energizing solenoid. With the A form of the invention, a stack of unrecorded record sheets is inserted in the record magazine with their head ends disposed toward the cylinder. Individual sheets are loaded onto the cylinder by operating the feed mechanism. In the B and C forms of the invention, the record sheets are manually loaded onto the form, the holes or adhesive strip serving to indicate which edge of the sheet should first be presented to the drum. Upon closing of the drive-energizing switch, the drum begins to rotate and the carriage to be translated relative to the drum at a speed determined by the operating speed of the motor and the design of the drive train. With 8½" by 11" sheets, I have found that from 10 to 30 lines per inch and a linear scanning speed of from 4 to 10 inches per second give an appropriate range of operating conditions. Scanning 20 lines per inch at about 5½" per second on an 8½" by 11" sheet gives about 5 minutes of recording time.

To record, the gang switch is adjusted to the record position and the material to be recorded is spoken into the speaker-microphone after the closing of the solenoid-energizing switch. A record may be reproduced in exactly the same manner, except that the gang switch is adjusted to the reproduce position, inverting the amplifier connections and deenergizing the erase head.

One example of the flexibility and adaptability of the apparatus to office dictation work is to be found in the ease with which portions of a previously recorded message may be deleted and simultaneously replaced with new material. If a mistake has been made in dictation, the carriage is back spaced either semi-automatically or manually to a point somewhat in advance of the portion of the record bearing the material to be erased. The equipment is then adjusted for reproduction and the energizing switch closed until the last of the material which is to be retained is heard. At this point, the energizing switch is opened, the equipment readjusted for recording, the energizing switch is closed, and the correct material is spoken into the speaker-microphone. Since the erase head sweeps the track just in advance of the recording head, and since it is energized whenever the apparatus is adjusted for recording, the previously recorded material is obliterated and the erased track is immediately rerecorded with the new material. When, as is contemplated by the invention, the energizing switch takes the form of a foot switch, this cycle of erasing and redictating can be accomplished with great accuracy. For example, it is possible to remove as little as a single word and replace it with another word, and thereby produce a record which, upon reproduction, gives no evidence that it was not recorded consecutively. A further demonstration of the accuracy of alignment which is accomplished by the invention is the fact that even a record which has been removed from the machine may be reinserted for erasure and redictation in the manner above described.

From the foregoing it will be seen that according to the invention magnetic recordings are made in the form of what is effectively a single helical track upon foldable, creasible, rectangular sheets which have been flexed to cylindrical form. Upon removal and unflexing of the sheets, the single track is separated into fragments which may later be reassembled for continuous reproduction. Both the unflexing and reassembling may be accomplished semi-automatically, as in the A form of the invention, illustrated in Figures 4 and 5; or by manually propelling a sheet along a guided path, as in the B form illustrated in Figures 8 and 9; or, most simply, by manually propelling and visually guiding a sheet to a properly registered position, as described in connection with the C form of the invention, illustrated in Figures 12 and 13.

I claim:

1. In a dictation machine for use with creasible and flexible rectangular record sheets adapted for magnetic recording, a drum for supporting such a record sheet wrapped thereon, the drum being mounted for rotation on a horizontal axis with a side of the drum presented toward the front of the machine, controllable drive mechanism for rotating the drum in a direction to cause the drum surface to move upwardly at the front of the machine, an enclosure for the drum having an opening located to provide access to the drum from the front of the machine, said opening being elongated lengthwise of the drum and the dimension of said opening lengthwise of the drum being at least equal to one of the dimensions of the rectangular record sheets to be used with the machine to provide for presentation of a record sheet edgewise to the drum from the front of the machine, the drum having attachment means for engaging the edge portion of a record sheet presented to the drum through said opening and said drum having a circumferential dimension less than the dimension of the sheet to be wrapped thereon in the direction of wrapping so that the edge of the sheet in trailing position during rotation by said drive mechanism overlaps the leading edge of the sheet, a magnetic scanning device having yielding pressure against the drum so as to contact a record sheet when wrapped on the drum, traverse mechanism for shifting the scanning device axially of the drum to provide for scanning of a sheet on the drum by said magnetic device in a track repeatedly crossing the lapped edges of the sheet in a direction from the trailing edge portion of the lapped surface of the sheet as the drum rotates, a stripper element adjacent the surface of the drum in the region of the opening in said enclosure, and manual means for rotating the drum at will in a direction reverse to the direction provided by said drive mechanism and providing in combination with said stripper element for the ejection of a record sheet trailing edge first in a direction toward the front of the machine.

2. In a dictation machine, comprising a rotatable drum, a creasible and flexible rectangular nonmagnetic record sheet carrying dispersed magnetizable particles adapted to be wrapped on the drum with opposite edges overlapped, controllable drive mechanism for rotating the drum in the direction in which the outer overlapped edge of the sheet is in trailing position, an enclosure for the drum having an opening through which the record sheet may be presented edgewise to the drum, the portions of the enclosure forming the edges of said opening which extend lengthwise of the drum being sufficiently close to the drum to receive the trailing edge portion of a sheet therebetween when the leading edge portion of the sheet is wrapped on the drum, the leading edge portion of the sheet and the drum having interengageable attachment means providing for drive of the leading edge of the sheet in substantially constant circumferential relation to the drum, the trailing edge having freedom for movement circumferentially of the drum, a magnetic scanning device having yielding pressure against the drum so as to contact the record sheet when wrapped on the drum, traverse mechanism for shifting the scanning device axially of the drum to provide for scanning of the sheet on the drum by said magnetic device in a track repeatedly crossing the lapped edges of the sheet in a direction from the trailing edge portion to the lapped surface of the sheet to provide for ironing out of any crease present in the record sheet intermediate the leading and trailing edges, and a manually rotatable knob for rotating the drum at will to bring the trailing edge of the sheet when wrapped on the drum to a position radially aligned with the opening in the enclosure, and the drum being reversely rotatable to provide for removal of the record sheet trailing edge first.

3. Equipment for scanning flexible, rectangular record sheets carrying magnetizable material adapted to the recording of intelligence, comprising a rotatable form adapted to support a record sheet wrapped thereon with opposite edges overlapped, means for rotating the form with a sheet thereon in a direction to effect scanning in a track crossing the overlap from the upper to the lower layer, stripper means adjacent the form, means for effecting reverse rotation of the form to strip a sheet therefrom, said last mentioned means comprising a pad and mechanism for bringing the pad into thrust-imparting relationship with the form and thereafter to propel the pad in a path circumferential of the axis of the form.

4. Apparatus for scanning rectangular record sheets carrying magnetizable material, comprising a rotatable system including a mandrel adapted to support a sheet with the rotationally trailing edge overlapping the rotationally leading edge, a stripper element disposed near the surface of the mandrel and adapted to engage the said trailing edge upon reverse rotation of the mandrel, and mechanism for effecting rotation of the mandrel in the counter-scanning direction, said mechanism comprising a pad adapted to engage the surface of the mandrel, a control, and linkage interconnecting the pad and the control for bringing the pad into engagement with the surface of the mandrel and thereafter propelling the pad circumferentially of the mandrel in a reverse direction.

5. Apparatus for scanning rectangular record sheets carrying magnetizable material, comprising a rotatable system including a mandrel adapted to support a sheet with the rotationally trailing edge overlapping the rotationally leading edge, a stripper element disposed near the surface of the mandrel and adapted to engage the said trailing edge upon reverse rotation of the mandrel, and mechanism for effecting rotation of the mandrel in the counter-scanning direction, said mechanism comprising an element reciprocable in a plane transverse the axis of the mandrel and adapted to tangentially engage an element of the rotating system and to rotate the mandrel in a counter-scanning sense.

6. Magnetic recording equipment including a revolvable support, a magnetizable rectangular record sheet wrapped upon the support with opposite edges of the sheet overlapped, power mechanism for rotating the support in that direction in which the outer overlapped edge of a record sheet on the support is in trailing position, a magnetic scanning device engageable with the record for scanning a track crossing the overlapped edges during power drive, a stripper element adjacent to the support positioned to engage under the outer overlapped trailing edge of the sheet upon reverse rotation of the support, manually operable means for reversely rotating the support at will, the scanning device being displaceable away from the record to clear the outer overlapping edge during reverse rotation, the record sheet having fastening means for securing the sheet to the support adjacent the inner overlapped edge and the support having cooperating interengageable sheet fastening means, the cooperating fastening means of the sheet and support comprising elements interengageable to provide for rotation of the sheet with the support during power drive of the support in said first direction, and the cooperating fastening means being readily disengageable upon manual reverse rotation of the support.

7. Magnetic recording equipment including a revolvable support, a magnetizable rectangular record sheet wrapped upon the support with opposite edges of the sheet overlapped, power mechanism including drive means and a disengageable drive connection between the drive means and said support for revolving the support in that direction in which the outer overlapping edge of a record sheet on the support is in trailing position, a magnetic scanning device engageable with the record sheet for scanning a track crossing the overlapping edge during power drive, fastening means for detachably engaging the inner overlapped edge of the record sheet to provide for revolution of the sheet with the support during power drive of the support in said direction, means mounted for revolution with said support and manually operable to reversely revolve said support in that direction in which the outer overlapping edge of a record sheet on the support is in leading position, and control means effective to start record revolution and concurrently move said scanning device into engagement with the record sheet to provide for scanning during power drive, and effective to disengage said drive connection and to concurrently disengage said scanning device from the sheet to provide for manual reverse revolution of the support independent of the drive means and to provide freedom for the outer overlapping edge of a record sheet to clear said device when in leading position during reverse revolution.

8. Magnetic recording equipment including a revolvable support, a magnetizable rectangular record sheet wrapped upon the support with opposite edges of the sheet overlapped, power mechanism including a drive means and a disengageable drive connection between the drive means and said support for revolving the support in that direction in which the outer overlapping edge of a record sheet on the support is in trailing position, a magnetic scanning device engageable with the record sheet for scanning a track crossing the overlapping edge during power drive, fastening means on said support for detachably engaging the inner overlapped edge of the record sheet to provide for revolution of the sheet with the support during power drive of the support in said direction, said fastening means being adapted to permit stripping of the sheet from said support, a stripper element adjacent to the support positioned to engage under the outer overlapping trailing edge for stripping the sheet from the support upon reversely revolving the support while said scanning device is disengaged from said sheet, start-stop control means for starting record revolution and concurrently moving said scanning device into engagement with the record sheet and effective when moved to stop position to disengage said drive connection and to disengage said scanning device from the sheet, and manually operable means for reversely revolving said support while said start-stop means is in stop position.

9. In a dictation machine using creasible, rectangular record sheets adapted for magnetic recording, a drum for supporting such a record sheet wrapped thereon, the drum being mounted for rotation on a horizontal axis with a side of the drum presented toward the front of the machine, controllably engageable and disengageable drive mechanism for rotating the drum in a direction to cause the drum surface to move upwardly at the front of the machine, an enclosure for the drum having an opening located to provide access to the drum from the front of the machine, said opening being elongated lengthwise of the drum and the dimension of said opening lengthwise of the drum being at least equal to one of the dimensions of the rectangular record sheets to be used with the machine to provide for presentation of a record sheet edgewise to the drum from the front of the machine, the portions of the enclosure forming the edges of said opening which extend lengthwise of the drum being sufficiently close to the drum to receive the trailing edge portion of the sheet therebetween when the leading edge portion of the sheet is wrapped on the drum, the drum having attachment means for engaging the edge portion of a record sheet presented to the drum through said opening, a magnetic scanning device having yielding pressure against the drum so as to contact a record sheet when wrapped on the drum, drive mechanism for shifting the scanning device axially of the drum to provide for scanning of a sheet on the drum by said device in a track repeatedly crossing the edges of the sheet in a direction from the trailing portion to the leading portion of the sheet as the drum rotates, and means for rotating the drum at will to bring the trailing edge of the sheet when wrapped on the drum to a position radially aligned with the opening in the enclosure, the drum being reversely rotatable when said first drive mechanism is disengaged to provide for removal of the record sheet through said opening trailing edge first.

References Cited in the file of this patent

UNITED STATES PATENTS

| | | |
|---|---|---|
| 1,075,496 | Robinson | Oct. 14, 1913 |
| 2,043,884 | Crudo | June 9, 1936 |
| 2,216,608 | Anderson | Oct. 1, 1940 |
| 2,265,034 | Gailmard | Dec. 2, 1941 |
| 2,431,360 | Philpott | Nov. 25, 1947 |
| 2,535,480 | Begun | Dec. 26, 1950 |
| 2,645,494 | Keller | July 14, 1953 |
| 2,653,819 | Roberts | Sept. 29, 1953 |